US010686500B2

(12) United States Patent
Meilhac et al.

(10) Patent No.: US 10,686,500 B2
(45) Date of Patent: Jun. 16, 2020

(54) PRE-CODING STEERING MATRIX FOR MU-MIMO COMMUNICATION SYSTEMS

(71) Applicant: RIVIERAWAVES (RW), Biot (FR)

(72) Inventors: Lisa Meilhac, Valbonne (FR); Ahmad Bazzi, Nice (FR)

(73) Assignee: RIVIERAWAVES (RW), Biot (FR)

( * ) Notice: Subject to any disclaimer, the term of this patent is extended or adjusted under 35 U.S.C. 154(b) by 0 days.

(21) Appl. No.: 16/188,346

(22) Filed: Nov. 13, 2018

(65) Prior Publication Data
US 2019/0149201 A1 May 16, 2019

(51) Int. Cl.
| H04B 7/0456 | (2017.01) |
| H04B 7/0452 | (2017.01) |
| H04B 7/06 | (2006.01) |
| H04W 84/12 | (2009.01) |

(52) U.S. Cl.
CPC ......... H04B 7/0456 (2013.01); H04B 7/0452 (2013.01); H04B 7/0615 (2013.01); H04W 84/12 (2013.01)

(58) Field of Classification Search
CPC .. H04B 7/0456; H04B 7/0615; H04B 7/0452; H04W 84/12
USPC ........................................................ 375/267
See application file for complete search history.

(56) References Cited

U.S. PATENT DOCUMENTS

| 7,039,442 B1* | 5/2006 | Joham | H04B 7/0619 370/335 |
| 7,486,740 B2* | 2/2009 | Inanoglu | H04L 25/03343 375/267 |
| 7,917,107 B2* | 3/2011 | Gu | H04L 25/0242 375/347 |
| 8,248,978 B2 | 8/2012 | Zhang et al. | |
| 8,543,070 B2 | 9/2013 | Howard et al. | |
| 8,811,267 B2 | 8/2014 | Kim et al. | |

(Continued)

OTHER PUBLICATIONS

Zhang, "Coordination beamforming for secrecy enhancement in the downlink MU-MIMO cellular networks" 2016 19th International Symposium on Wireless Personal Multimedia Communications (WPMC) Year: 2016.*

(Continued)

*Primary Examiner* — Juan A Torres
(74) *Attorney, Agent, or Firm* — Hauptman Ham, LLP (57) ABSTRACT

A method for obtaining a steering matrix Q to be applied for MU-MIMO transmission of data for a MU-MIMO communication system which comprises at least a transmitter comprising at least NTX=2 transmit antennas and K=2 receivers with each $d^{th}$ receiver comprising $NRX^{(d)}$ receive antennas, respectively, wherein $\Sigma_d NRX^{(d)} \geq NTX$. The method is implemented at the level of the transmitter. The obtained steering matrix Q to be applied for DL-MU-MIMO transmission allows of supporting extended configurations of a DL-MU-MIMO communication system and allows of improving significantly the quality of subsequent DL-MU-MIMO transmissions, when the number of receive antennas $\Sigma_d NRX^{(d)}$ is larger than the number NTX of transmit antennas.

18 Claims, 5 Drawing Sheets

(56) References Cited

U.S. PATENT DOCUMENTS

| | | | |
|---|---|---|---|
| 8,824,386 B2* | 9/2014 | Pare, Jr. | H04B 7/0452 370/329 |
| 8,897,393 B1* | 11/2014 | Zhang | H04L 25/0204 375/316 |
| 9,136,995 B2 | 9/2015 | Thomas et al. | |
| 9,173,221 B2 | 10/2015 | Cordeiro et al. | |
| 9,319,122 B1* | 4/2016 | Zhang | H04B 7/0452 |
| 9,490,882 B1 | 11/2016 | Schelstraete et al. | |
| 10,038,996 B1* | 7/2018 | Srinivasa | H04B 7/0452 |
| 2008/0075058 A1 | 3/2008 | Mundarath et al. | |
| 2008/0212461 A1* | 9/2008 | Pande | H04B 7/0626 370/203 |
| 2010/0248635 A1 | 9/2010 | Zhang et al. | |
| 2015/0016558 A1 | 1/2015 | Choi et al. | |
| 2015/0180560 A1* | 6/2015 | Van Nee | H04B 7/0434 370/329 |
| 2016/0043783 A1* | 2/2016 | Xia | H04B 7/0417 370/329 |
| 2016/0359532 A1 | 12/2016 | Cao et al. | |
| 2017/0230150 A1* | 8/2017 | Koo | H04B 7/0452 |

OTHER PUBLICATIONS

Li, "Codebook selected beamforming algorithm for multiuser MIMO systems" Journal of Systems Engineering and Electronics Year: 2011.*

European Search Report from corresponding European Patent Application No. 17306578, May 11, 2018, pp. 1-6, European Patent Office, Munich, Germany.

\* cited by examiner

Fig. 1

Prior Art

Fig. 2

Prior Art

PRE-CODING STEERING MATRIX FOR MU-MIMO COMMUNICATION SYSTEMS

FIELD OF THE INVENTION

The present invention generally relates to a technique first developed for "802.11ac" version of the standard "802.11" and referred to as MU-MIMO (Multi-User Multiple-Input Multiple-Output) where transmitting communication device and receiving communication devices of a wireless local area network (WLAN) are equipped with multiple antennas.

The invention relates more specifically to a method for obtaining a steering matrix to be applied for MU-MIMO transmission. Note that, in literature, said steering matrix may also be called pre-coding matrix.

Applications can be found notably in a WiFi Access Point (AP) modem transmitter for DL(DownLink)-MU-MIMO transmission of data.

BACKGROUND OF THE INVENTION

Figure 1:
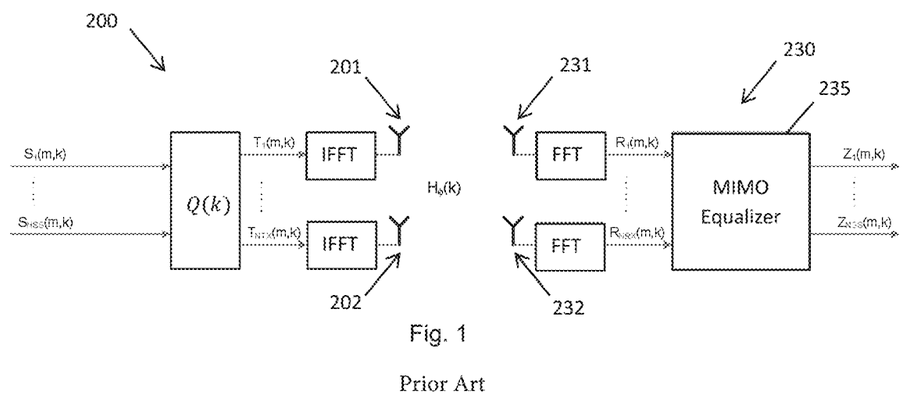
FIG. 1 illustrates schematically a SU-MIMO wireless communication system.

FIG. 1 highlights the main components of a SU-MIMO transmission model of digital data. Said digital data may be encoded by using Orthogonal Frequency-Division Multiplexing (OFDM) method.

The illustrated SU-MIMO transmission model is more particularly adapted to the transmission of digital data, encoded with OFDM method, from an AP, as a transmitter 200, to a user station, as a receiver 230.

Let define the following notations used notably onto FIG. 1:
 NTX is the number of transmit antennas 201, 202 of the transmitter 200;
 NSS is the number of spatial streams; and
 NRX is the number of receive antennas 231, 232 of the receiver 230.

The number of spatial streams is defined as the number of data streams which are simultaneously broadcasted via the transmit antennas 201, 202. Obviously, it is mandatory that NSS≤NTX.

Let call $S_i(m,k)$ a modulated symbol, for instance a QAM (Quadrature Amplitude Modulation) symbol, sent on a $k^{th}$ subcarrier of a $m^{th}$ OFDM symbol on the $i^{th}$ spatial stream.

Let further define:
 $S(m, k) = [S_1(m, k) \ldots S_{NSS}(m, k)]^T$, the NSS dimension multi-stream modulated symbol to be transmitted and
 $T(m, k) = [T_1(m, k) \ldots T_{NTX}(m, k)]^T$, the NTX dimension multi-antenna transmit signal,
where exponent T characterizes the transpose operator.

Let have $T(m, k) = Q(k)S(m, k)$, where $Q(k)$ is a matrix used to convert the NSS symbols to be transmitted into NTX complex signals.

This conversion is done linearly by multiplying vectors S(m, k) of length NSS by a $Q(k)$ matrix of dimensions NTX×NSS. Each vector of length NSS is intended to be transmitted during one OFDM symbol (In Wi-Fi, the symbol duration is often equal to 4 is, but not always) and over a given subcarrier k. The matrix $Q(k)$, which can be called spatial mapping matrix, may vary from one subcarrier to the other, but not from one OFDM symbol to the other, during a whole packet transmission.

The spatial mapping matrix $Q(k)$ is thus used for SU-MIMO beamforming. This technique is implemented by the transmitter 200 with multiple antennas 201, 202 to steer signals using knowledge of the physical channel between the AP and the user station in order to improve throughput or the covering range. In such a case, the transmitter 200 may be called a beamformer and the matrix $Q(k)$ is merely called a steering matrix. It can be determined from a beamforming feedback matrix $V(k)$ that is sent back to the beamformer 200 by the receiver 230 which may then be called beamformee, according to standard beamforming calibration processes, also called sounding processes (an example of which is detailed hereafter).

Before being emitted the NTX dimension multi-antenna transmit signal T(m, k), and more particularly each component $T_i(m, k)$ of said signal, with $i = \{1, \ldots, NTX\}$, is transformed in a conventional way according to Inverse Fast Fourier Transform (or IFFT) for converting each component of said signal from its original frequency domain to a representation in the time domain.

Now, let define $R(m, k) = [R_1(m, k) \ldots R_{NRX}(m, k)]$, the signal received on the NRX antennas 231, 232 of the receiver 230.

More particularly, in a conventional way, said received signal R(m, k), and more particularly each component $R_i(m, k)$ of said received signal, with $i = \{1, \ldots, NRX\}$, is obtained by transforming the radio-frequency signal received by each $i^{th}$ receive antenna according to Fast Fourier Transform (or FFT) for converting each component of said signal from the time domain to its original frequency domain.

Assuming an ISI (InterSymbol Interference) free transmission, and assuming that all offsets have been perfectly compensated, the frequency domain model is given by the following equation:

$$R(m,k) = H_\phi(k)T(m,k) + WGN(m,k)$$

$$R(m,k) = H(k)S(m,k) + WGN(m,k)$$

where $WGN \sim N(0, \sigma^{-2})$ is a White Gaussian Noise, further with the assumption that all the received paths are affected by the same noise level, and where $H_\phi(k)$ is a NRX×NTX matrix characterizing the physical channel between the antennas 201, 202 of the transmitter 200 and the ones 231, 232 of the receiver 230. $H(k)$ is a NRX×NSS matrix characterizing the effective channel between the transmitted symbol S(m, k) and the received signal R(m, k), with: $H(k) = H_\phi(k)Q(k)$.

In the SU-MIMO beamforming presented here above, all space-time streams of the signal to be transmitted are intended for reception at a single station 230. With DL-MU-MIMO beamforming, disjoint subsets of the space-time streams are intended for reception at different user stations.

From U.S. Pat. No. 9,319,122 B1, it is known a wireless network device, such as an AP, of a WLAN which transmits simultaneously independent data streams to at least two user stations according to a multi-user (MU) mode via an antenna array. In order to reduce, or even in order to cancel out, interference at a receiving station due to simultaneous transmissions from several antennas of the AP to one or more user stations, the AP develops respective transmit beamsteering vectors for downlink transmissions towards the user stations.

Figure 2:
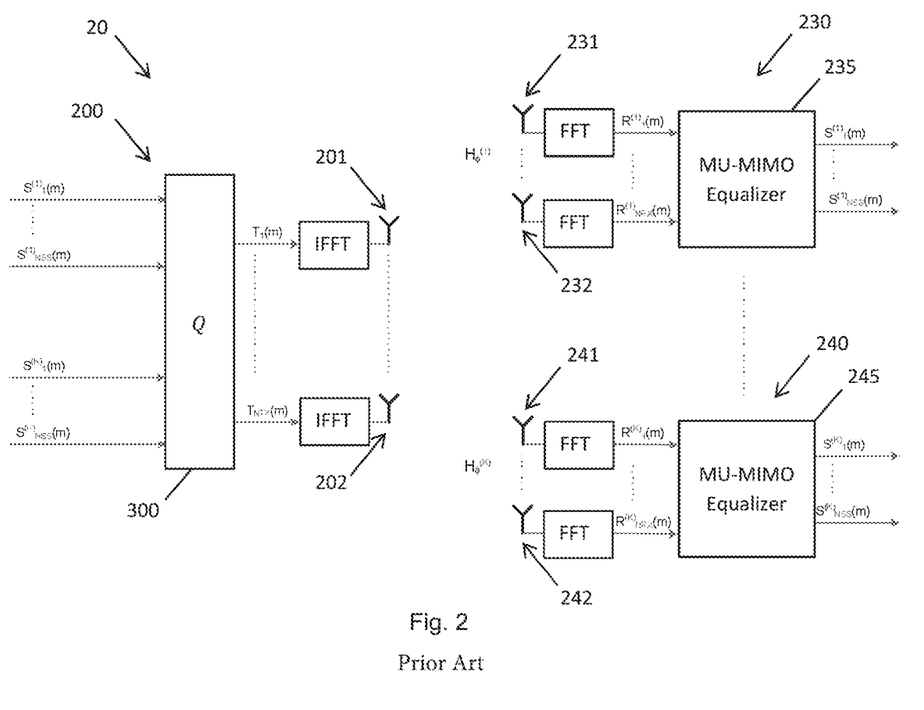
FIG. 2 illustrates schematically a MU-MIMO wireless communication system by which the invention can be implemented.

FIG. 2 highlights the main components of a DL-MU-MIMO-OFDM transmission model. The applicant's admitted prior art as discussed below in connection with FIG. 2 may be considered as an adaptation of the disclosure of document U.S. Pat. No. 9,319,122 B1 to the transmission of digital data encoded with OFDM method. Hereafter, for sake of simplicity, subcarrier index k has been omitted in comparison with the here above equations.

The transmitter (or beamformer) 200 should calculate a DL-MU-MIMO steering or pre-coding matrix Q in order to cancel out crosstalk between participating user stations 230, 240. Said DL-MU-MIMO steering matrix Q can be determined from the beamforming feedback matrices $V^{(d)}$ of the participating user stations 230, 240.

Let add some additional notations:

K, the number of user stations 230, 240 participating to the considered MU-MIMO transmitted frame, with K≤4 according to the standard specifications;

NSStot, the total number of spatial streams comprised in the MU-MIMO frame to be transmitted, with NSStot being constrained by NSStot≤NTX;

$NSS^{(d)}$, the number of spatial streams intended for the $d^{th}$ user station, constrained by $NSS^{(d)}$<NSStot since $\Sigma_d NSS^{(d)}$=NSStot; and $NRX^{(d)}$, the number of receive antennas (231, 232 or 241, 242) of the $d^{th}$ user station (230 or 240, respectively), with $NRX^{(d)} \geq NSS^{(d)}$ since each stream is intended to be received by one receive antenna.

Let further call $S^{(d)}(m)=[S_1^{(d)}(m) \ldots S_{NSS^{(d)}}^{(d)}(m)]^T$ the $NSS^{(d)}$-dimension QAM-symbol to be transmitted to the $d^{th}$ user.

Then, let $R^{(d)}(m)=[R_1^{(d)}(m) \ldots R_{NRX^{(d)}}^{(d)}(m)]^T$, the $NRX^{(d)}$-dimension signal received by the $d^{th}$ user station, verifies:

$$R^{(d)}(m)=H^{(d)}[S^{(1)}(m) \ldots S^{(K)}(m)]^T+WGN^{(d)}(m)$$

$$R^{(d)}(m)=H_\phi^{(d)}Q[S^{(1)}(m) \ldots S^{(K)}(m)]^T+WGN^{(d)}(m)$$

By splitting Q between the user stations 230, 240 as $Q=[Q^{(1)} \ldots Q^{(K)}]$, this equation can be decomposed into two parts:

$$R^{(d)}(m) = H_\phi^{(d)}Q^{(d)}S^{(d)}(m) + \sum_{u=1, u \neq d}^{K} H_\phi^{(d)}Q^{(u)}S^{(u)}(m) + WGN^{(d)}(m)$$

The first part of the equation comprises the signal of interest, whereas the second part characterizes the interference of the signal(s) transmitted to the other user station(s) on the signal received by the $d^{th}$ user station. As mentioned earlier, the transmitter 200 shall define the matrix Q in order to minimize, or even cancel out, the interference part for each of the K receivers 230, 240 or in order to optimize the SINR (signal-to-interference-plus-noise ratio) received by each user station.

More generally, the problem of all existing algorithms, like the one disclosed into document U.S. Pat. No. 9,319,122 B1, is that they assume that the number of receive antennas (231, 232 or 241, 242) of each user station (230 or 240, respectively) is equal to the number of spatial streams intended for this user station, e.g. $NRX^{(d)}=NSS^{(d)}$. Consequently, they assume that $\Sigma_d NRX^{(d)} \leq NTX$.

In this context, i.e. in communication systems of the type briefly described above and notably of the type referred to as (DL-)MU-MIMO, it is an object of the invention to provide a method for obtaining a steering matrix Q to be applied for (DL-)MU-MIMO transmission that supports extended configurations of a (DL-)MU-MIMO communication system.

Another object of the invention is to provide a method for obtaining a steering matrix Q to be applied for (DL-)MU-MIMO transmission that improves significantly the quality of a (DL-)MU-MIMO transmission when the number of antennas of the receivers is larger than the number of streams intended for these receivers, that is when $\Sigma_d NRX^{(d)} \geq NTX$.

A further object of the invention is to provide a method for obtaining a steering matrix to be applied for (DL-)MU-MIMO transmission that offers much better performance than existing algorithms when $\Sigma_d NRX^{(d)} > NTX$.

SUMMARY OF THE INVENTION

To at least one of these ends, it is provided, according to a first aspect of the invention, a method for obtaining a steering (or pre-coding) matrix $Q=[Q^{(1)}, \ldots, Q^{(K)}]$ to be applied for MU-MIMO transmission of data. The method is implemented by a MU-MIMO communication system which comprises at least one transmitter comprising at least NTX=2 transmit antennas and K=2 receivers, with each $d^{th}$ receiver comprising at least $NRX^{(d)}$ receive antennas, wherein $\Sigma_d NRX^{(d)} \geq NTX$. The method comprising, at the level of the transmitter, the following sequence of steps for each value of d={1,2}:

Computing a channel inversion matrix $C^{(d)}$ of size NTX× $NRX^{(d)}$ wherein:

$$C^{(d)}=(F^{(1)H}F^{(1)}+F^{(2)H}F^{(2)})^{-1}F^{(d)H},$$

wherein $F^{(d)}$ is a matrix of size NTX×$NRX^{(d)}$ whose components depend on those of a matrix $H_\phi^{(d)}$ of size NTX×$NRX^{(d)}$ which characterizes physical channel between the transmitter and the $d^{th}$ receiver, and more particularly wherein $F^{(d)}=H_\phi^{(d)}U^{(d)H}$ with $U^{(d)}$ being a unitary matrix, i.e. $U^{(d)H}U^{(d)}=I_{NTX}$, and wherein exponent H refers to the Hermitian operator;

Computing a beamforming component $B^{(d)}$ by singular value decomposition of matrix product $F^{(d)}C^{(d)}$; and Computing the steering matrix Q according to $Q^{(d)}=C^{(d)}B^{(d)}$.

This algorithm does not tend to determine a steering matrix which allows of cancelling out the inter-user interference at the input of each receive antenna.

This algorithm proposes a way to compute a steering matrix Q to be applied for (DL-)MU-MIMO transmission that supports extended configurations of a (DL-)MU-MIMO communication system, at least since it allows to use more receive antennas than transmit antennas. Indeed, this algorithm allows to avoid the need to use an antenna reduction protocol or an interference cancellation protocol.

This algorithm further proposes a way to compute a steering matrix Q which allows of improving significantly the quality of subsequent DL-MU-MIMO transmissions when the number of antennas of the receivers is larger than the number of antennas of the transmitter, e.g. when $\Sigma_d NRX^{(d)} \geq NTX$. This improvement is particularly more relevant when at least one among the number of antenna(s) $NRX^{(1)}$ of the first receiver and the number of antenna(s) $NRX^{(2)}$ of the second receiver is strictly inferior to the number of spatial streams intended for said receivers, i.e. $\Sigma_d NSS^{(d)}$. Since more hardware resources are put to contribution owing to the present algorithm, it comes that said algorithm offers much better performance than existing algorithms when $\Sigma_d NRX^{(d)} > NTX$ and in particular when at least one among the number of antenna(s) $NRX^{(1)}$ of the first receiver and the number of antenna(s) $NRX^{(2)}$ of the second receiver is further strictly inferior to the number of spatial streams intended for said receivers, i.e. $\Sigma_d NSS^{(d)}$.

Optionally, the invention may have any of the following facultative features that can be used separately or in combination.

According to an optional embodiment of the first aspect of the invention, the beamforming component $B^{(d)}$ is more particularly computed as $NSS^{(d)}$ singular vectors corresponding to the $NSS^{(d)}$ strongest singular values of matrix product $F^{(d)}C^{(d)}$, with the steering matrix component $Q^{(d)}$ being of size NTX×NSS$^{(d)}$, where NSS$^{(d)}$ is a number of spatial streams intended for the d$^{th}$ receiver.

According to another optional embodiment of the first aspect of the invention, the MU-MIMO communication system is a WiFi communication system, the at least one transmitter is an access point (AP) of said WiFi communication system, the K=2 receivers are user stations of said WiFi communication system; the method according to the first aspect of the invention being more particularly a method for obtaining a steering matrix Q to be applied for DL-MU-MIMO transmission of data.

Thus the method can be implemented in a WiFi AP modem transmitter for DL-MU-MIMO transmission.

According to another optional embodiment of the first aspect of the invention, the method further comprises, before said sequence of steps, a sounding step comprising at the level of the transmitter the following substeps:

Emitting a Null Data Packet (NDP) frame comprising NTX streams from transmit antennas, then From a first receiver among the K=2 receivers, receiving, as a response to the NDP frame, a first set of data on which depends the matrix Hφ$^{(1)}$ of size NTX×NRX$^{(1)}$ which characterizes physical channel between the transmitter and the first receiver, From a second receiver among the K=2 receivers, receiving, as a response to the NDP frame, a second set of data on which depends the matrix H$_φ$$^{(2)}$ of size NTX×NRX$^{(2)}$ which characterizes physical channel between the transmitter and the second receiver.

Thus the method is compatible with standard sounding processes as already performed to acquire knowledge about the physical channels between the transmitter and the receivers. More particularly, no change in the way to operate the sounding process is required at least at the level of the receivers with respect to standard sounding processes.

According to another optional embodiment of the first aspect of the invention, each of said first set of data and said second set of data comprises matrices V$^{(d)}$ of size NTX×NRX$^{(d)}$ and Σ$^{(d)}$ of size NRX$^{(d)}$×NRX$^{(d)}$, with d=1 and d=2 respectively, said matrices V$^{(d)}$ and Σ$^{(d)}$ being determined as a singular value decomposition of H$_φ$$^{(d)}$=U$^{(d)}$Σ$^{(d)}$V$^{(d)H}$, wherein V$^{(d)}$ is an orthonormal matrix comprising the NRX$^{(d)}$ left singular vectors of H$_φ$$^{(d)}$ and Σ$^{(d)}$ is a diagonal matrix comprising the NRX$^{(d)}$ strongest singular values of H$_φ$$^{(d)}$. At this stage, each of matrices H$_φ$$^{(1)}$ and H$_φ$$^{(2)}$ might be evaluated in function of the corresponding matrices V$^{(d)}$ and Σ$^{(d)}$ by applying H$_φ$$^{(d)}$=U$^{(d)}$Σ$^{(d)}$ V$^{(d)}$H, providing U$^{(d)}$ is known for d=1 and d=2.

Thus, on the contrary of standard pre-coding processes according to which the transmitter uses only the values of the first column of each matrix V$^{(d)}$ (the ones corresponding to the strongest singular vector), the transmitter implemented according to the method for MU-MIMO transmission of data as introduced below in connection with the second aspect of the invention uses the full NTX×NRX$^{(d)}$ values of each matrix V$^{(d)}$ as a measure from which the physical channel between the transmitter and the d$^{th}$ receiver can be determined.

The method according to the first aspect of the invention is a computer implemented method. At least some steps of the method, in particular the steps of computing a channel inversion matrix C$^{(d)}$, computing a beamforming component B$^{(d)}$ and computing the steering matrix component Q$^{(d)}$ are executed by a data processing device such as a processor or a microprocessor.

According to a second aspect of the invention, it is provided a method for MU-MIMO transmission of data. As the method according to the first aspect of the invention, the method according to its second aspect is implemented by a MU-MIMO communication system which comprises at least a transmitter comprising at least NTX=2 transmit antennas and K=2 receivers, each d$^{th}$ receiver comprising NRX$^{(d)}$ receive antennas, wherein Σ$_d$ NRX$^{(d)}$>NTX. The method according to the second aspect of the invention comprises, with a steering (or pre-coding) matrix Q=[Q$^{(1)}$, ... , Q$^{(K)}$] being obtained according to the method according to the first aspect of the invention, the following steps:

At the level of the transmitter, pre-coding a modulated data symbol S$^{(d)}$(m) of an m$^{th}$ symbol to be transmitted to the d$^{th}$ receiver among said K=2 receivers according to Q$^{(d)}$S$^{(d)}$(m), then emitting simultaneously at least two signals, with each of said at least two signals being emitted from said at least NTX=2 transmit antennas, in order for the method according to the second aspect of the invention to further comprises the following steps:

At the level of the d=1 receiver among the K=2 receivers, receiving said at least two signals by the NRX$^{(1)}$ receive antennas, with:

$$R^{(1)}(m)=H_φ^{(1)}Q^{(1)}S^{(1)}(m)+H_φ^{(1)}Q^{(2)}S^{(2)}(m)+WGN^{(1)}(m),$$

where each R$^{(1)}$(m) is an NRX$^{(1)}$-dimension signal received by the d=1 receiver, and where H$_φ$$^{(1)}$ is a matrix of size NTX×NRX$^{(1)}$ characterizing physical channels and WGN$^{(1)}$(m) are terms which characterize noise levels, between the transmitter and the d=1 receiver;

At the level of the d=2 receiver among the K=2 receivers, receiving said at least two signals by the NRX$^{(2)}$ receive antennas, with:

$$R^{(2)}(m)=H_φ^{(2)}Q^{(1)}S^{(1)}(m)+H_φ^{(2)}Q^{(2)}S^{(2)}(m)+WGN^{(2)}(m),$$

where each R$^{(2)}$(m) is an NRX$^{(2)}$-dimension signal received by the d=2 receiver, and where H$_φ$$^{(2)}$ is a matrix of size NTX×NRX$^{(2)}$ characterizing physical channels and WGN$^{(2)}$(m) are terms which characterize noise levels, between the transmitter and the d=2 receiver.

According to an optional embodiment of the second aspect of the invention, the method further comprises, with each d$^{th}$ receiver comprising an equalizer, for instance a maximal-ratio combining (MRC) equalizer, a step comprising, with d={1,2}:

Equalizing the NRX$^{(d)}$-dimension signal R$^{(d)}$(m) by using coefficients W$^{(d)}$ according to Ẑ$^{(d)}$(m)≡W$^{(d)}$R$^{(d)}$(m), said coefficients W$^{(d)}$ being pre-computed at the level of each d$^{th}$ receiver from an estimation of the effective channel matrix H$_φ$$^{(d)}$Q$^{(d)}$, and Outputting a signal Ẑ$^{(d)}$(m) as an estimation of the modulated data symbol S$^{(d)}$(m).

Thus it appears that the method allows of cancelling out the inter-user interference at the output of each receiver equalizer or of optimizing the SINR (Signal-to-Interference-plus Noise Ratio) received by each receiver in order to retrieve each symbol of transmitted encoded data.

According to another optional embodiment of the second aspect of the invention, said symbol to be transmitted are encoded by using one among OFDM encoding and COFDM (for Coded Orthogonal Frequency-Division Multiplexing) encoding.

Thus the method works naturally with different encoding methods and notably those which are of most use or of most recent development.

According to the above recited optional embodiment of the second aspect of the invention, said symbol can further be data modulated into data symbol by using one among PSK modulation and QAM modulation.

Thus the method works naturally with different modulation methods and notably those which are of most use.

The method according to the second aspect of the invention is a computer implemented method. At least some steps of the method, in particular the steps of pre-coding said modulated data symbol $S^{(d)}(m)$, equalizing said $NRX^{(d)}$-dimension signal $R^{(d)}(m)$, and outputting $Z^{(d)}(m)$ are executed by data processing devices such as a processor or a microprocessor.

According to a third aspect of the present invention, it is provided a computer program product comprising instructions which, when implemented by at least one digital processing device, performs at least the steps of at least one method among the method for obtaining a steering matrix Q to be applied for MU-MIMO transmission of data according to the first aspect of the invention and the method for MU-MIMO transmission of data according to the second aspect of the invention.

According to a fourth aspect of the present invention, it is provided a non-transitory computer readable medium storing instructions which, when implemented by at least one digital processing device, performs at least the steps of at least one method among the method for obtaining a steering matrix Q to be applied for MU-MIMO transmission of data according to the first aspect of the invention and the method for MU-MIMO transmission of data according to the second aspect of the invention.

According to a fifth aspect of the present invention, it is provided a transmitter which comprises at least NTX=2 transmit antennas and which is intended to be used into a MU-MIMO communication system comprising further K=2 receivers, with each $d^{th}$ receiver comprising $NRX^{(d)}$ receive antennas, wherein $\Sigma_d NRX^{(d)} \geq NTX$. Said transmitter is configured to implement the method for obtaining a steering matrix Q to be applied for MU-MIMO transmission of data according to the first aspect of the present invention.

According to a sixth aspect of the present invention, it is provided a MU-MIMO communication system which comprises at least a transmitter which comprises at least NTX=2 transmit antennas and K=2 receivers, with each $d^{th}$ receiver comprising $NRX^{(d)}$ receive antennas, wherein $\Sigma_d NRX^{(d)} > NTX$. Said MU-MIMO communication system is configured to implement the method for MU-MIMO transmission of data according to the second aspect of the present invention.

According to an optional embodiment of the sixth aspect of the invention, at least one among the number of antenna(s) $NRX^{(1)}$ of the first receiver and the number of antenna(s) $NRX^{(2)}$ of the second receiver is strictly inferior to the number of spatial streams intended for said receivers, i.e. $\Sigma_d NSS^{(d)}$.

Further objects, features and advantages of the present invention will become apparent to the ones skilled in the art upon examination of the following description in reference to the accompanying drawings. It is intended that any additional advantages may be incorporated herein.

The figures are given as examples and are not restrictive to the invention. They are principle schematic representations intended to facilitate the understanding of the invention.

DETAILED DESCRIPTION

Herein sounding or calibration is a term used to denote the process performed by the transmitter to acquire channel state information (CSI) from each of the different receivers by sending training symbols (or streams) and waiting for the receivers to provide explicit feedback comprising a measure from which the physical channels between the transmitter and the receivers can be determined.

The term "stream" or "data stream" denotes a flow of data circulating in a communication system from point of origin to destination.

In a transmission system comprising several transmit antennas, the bit-stream to be transmitted can be split (spatial multiplexing) in several spatial streams. All spatial streams are transmitted within the same spectral channel, the spatial dimension being used to avoid/limit interference between the spatial streams.

The term "frame" denotes a data transmission unit which may consist of a set of successive OFDM symbols.

The term "Null Data Packet" denotes a frame used to sound the physical channel between the transmitter and the receiver. In WiFi, this frame is only composed of the preamble containing the training symbols used to estimate the CSI and it does not contain any symbol carrying data information.

The following detailed description of the invention refers to the accompanying drawings. While the description includes exemplary embodiments, other embodiments are possible, and changes may be made to the embodiments described without departing from the scope of the invention. The various steps illustrated in FIGS. 4 and 6 which are enclosed by dashed lines are optional and are not restrictive to the illustrated method(s).

FIG. 2 gives an example of the context to which the invention particularly applies, i.e. a multi-user MIMO communication system 20 where multiple receivers 230, 240 are intended to be addressed simultaneously taking advantage of the spatial dimension of the communication channels between the transmitter 200 and the receivers 230, 240 through the use of multiple transmit antennas 201, 202.

As illustrated, to achieve this, the transmitter or transmitting device or, according to a preferred embodiment, an AP 200, i.e. an access point (or base station) such as defined for instance in IEEE 802.11 specifications, is made able through its set of transmit antennas 201, 202 to create simultaneously constructive interferences, each one being intended for a given receiver or, according to the preferred embodiment, for a given user station 230 or 240. In 802.11 terminology, a user station is any device that has the capability to use the corresponding communication protocol, and according to the preferred embodiment the capability to use a Wi-Fi communication protocol. For example, a user station 230 or 240 is a laptop or a desktop personal computer (PC). For example, the AP 200 is a modem, such as a wireless mobile broadband modem operating at microwave frequencies.

FIG. 2 more particularly illustrates a part of the computational background and mathematical formalism under which pre-coding of the transmitted signals is actually performed by an AP 200 in order to obtain constructive (and destructive) interferences adapted to the location of multiple user stations 230 and 240.

In the case of a single-user or SU, all space-time streams in the transmitted signal are intended for reception by a single user station. With MU-MIMO beamforming and, according to the preferred embodiment, with DL-MU-MIMO beamforming, disjoint subsets of the space-time streams are intended for multiple user stations 230 and 240. Then, the transmitter 200 must include a beamformer component 300 capable of calculating a steering matrix Q according to which pre-coding of the symbol to be transmitted can be performed to define a composite RF signal to be broadcasted by the transmit antennas 201, 202. The pre-coding can thus be performed so that crosstalk, i.e., inter-user interference at user stations 230 and 240 can be controlled.

In order to describe the pre-coding of the symbol to be transmitted in details, let define the following parameters with references to FIG. 2:

NTX is the number of transmit antennas 201, 202 of the AP 200;

K is the number of user stations participating to the transmission of a considered frame;

$NRX^{(d)}$ is the number of receive antennas of the $d^{th}$ user station, with $d=\{1,\ldots,K\}$;

$NSS^{(d)}$ is the number of spatial streams allocated to the $d^{th}$ user station for transmitting the considered frame; and NSStot is the total number of spatial streams, $NSStot = \Sigma_d NSS^{(d)}$.

Let also define, always with references to FIG. 2:

$S^{(d)}(m) = [S_1^{(d)}(m) \ldots S_{NSS^{(d)}}^{(d)}(m)]^T$ the $NSS^{(d)}$-dimension modulated data symbol of an $m^{th}$ symbol to be transmitted to the $d^{th}$ user station, and $R^{(d)}(m) = [R_1^{(d)} \ldots R_{NRX^{(d)}}^{(d)}(m)]^T$, the $NRX^{(d)}$-dimension signal received by the $d^{th}$ user station that verifies:

$$R^{(d)}(m) = H_\phi^{(d)} Q[S^{(1)}(m) \ldots S^{(K)}(m)]^T + WGN^{(d)}(m),$$

wherein $H_\phi^{(d)}$ is a matrix of size $NTX \times NRX^{(d)}$ characterizing physical channel and wherein $WGN^{(d)}(m)$ are terms which characterize noise levels, between the AP 200 and the $d^{th}$ user station 230 or 240.

According to well-known background of the invention, said symbol to be transmitted may indeed be encoded, for instance by using one among OFDM encoding and COFDM (for Coded Orthogonal Frequency-Division Multiplexing) encoding. OFDM or COFDM symbol may further be modulated by using for instance one among PSK modulation and QAM modulation.

By splitting the steering matrix Q between the user stations as $Q = [Q^{(1)} \ldots Q^{(K)}]$, the above equation can be decomposed into two parts:

$$R^{(d)}(m) = H_\phi^{(d)} Q^{(d)} S^{(d)}(m) + \sum_{u=1, u \neq d}^{K} H_\phi^{(d)} Q^{(u)} S^{(u)}(m) + WGN^{(d)}(m)$$

The first part of the equation contains the signal of interest for the $d^{th}$ user station, whereas the second part characterizes the interference of the other user stations on the signal received by the $d^{th}$ user station. As mentioned earlier, the AP 200 shall define the steering matrix Q in order to control the interference part for each of the K user stations 230, 240.

Figure 3:
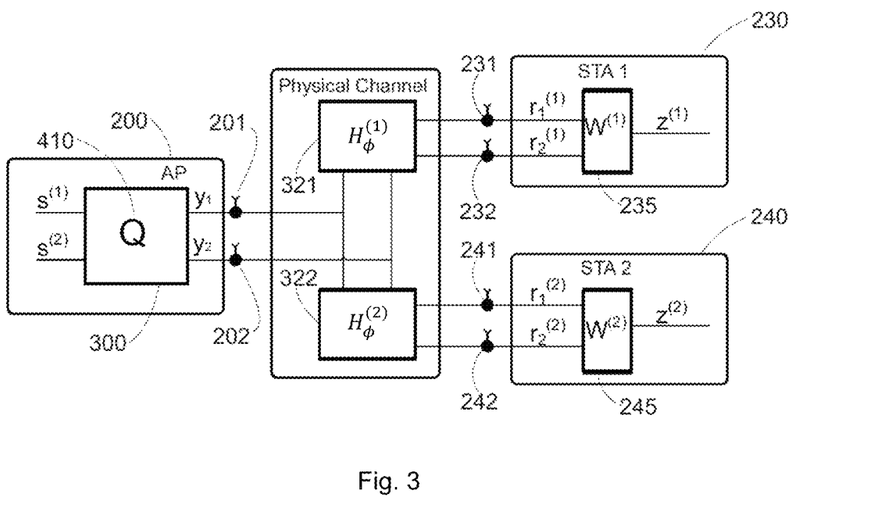
FIG. 3 illustrates schematically, in a different manner than that of FIG. 2, a MU-MIMO wireless communication system by which the invention can be implemented.

FIG. 3 illustrates a case of a MU-MIMO communication system 20 in which the AP 200 has only two transmit antennas: 201 and 202, communicating with K=2 user stations: 230 and 240, with each user station having two receive antennas: 231, 232 and 241, 242 respectively. While the AP 200 broadcasts the composite RF signal towards the two user stations, the objective is that modulated data symbol $S^{(1)}$ be transmitted mainly, if not exclusively, to the first user station 230 and modulated data symbol $S^{(2)}$ to the second one 240. To this end, as mentioned above, the broadcasted RF signal is pre-coded in the AP 200 with the help of a steering matrix Q adapted, according to the present invention, to take care of the characteristics of the communication channels or CSI. These characteristics, which are assumed to be known, even indirectly, beforehand by the AP 200, may be described under the form of the two illustrated $H_\phi^{(1)}$ and $H_\phi^{(2)}$ matrices 321 and 322. Each matrix $H_\phi^{(d)}$ among these matrices characterizing the physical channel between the AP 200 and one $d^{th}$ receiver among the K=2 user stations 230 and 240.

Hence, a set of two equations gives the signals $R^{(1)}(m)$ and $R^{(2)}(m)$ respectively received by the user stations 230 and 240:

$$R^{(1)}(m) = H_\phi^{(1)} Q^{(1)} S^{(1)}(m) + H_\phi^{(1)} Q^{(2)} S^{(2)}(m) + WGN^{(1)}(m), \text{ and}$$

$$R^{(2)}(m) = H_\phi^{(2)} Q^{(1)} S^{(1)}(m) + H_\phi^{(2)} Q^{(2)} S^{(2)}(m) + WGN^{(2)}(m).$$

Thus, in order to calculate the steering matrix Q, a beam-former component 300 needs to have, even indirectly, an accurate estimate of the physical channels over which the AP 200 is intended to transmit data to each $d^{th}$ user station, with d=[1,2]. The physical channels may be expressed directly in the form of matrices $H_\phi^{(d)}$, or indirectly, for instance through the knowledge of matrices $V^{(d)}$ and $\Sigma^{(d)}$, as detailed below.

An explicit mechanism called sounding or calibration is put in place to provide the required information from the user stations 230, 240, also called beamformee, to the AP 200, also called beamformer, prior to the broadcasting of data from the AP 200. For WiFi communication system, this mechanism is described in 802.11.ac standard. This mechanism is described hereafter with references to FIGS. 4, 5 and 8.

Figure 5:
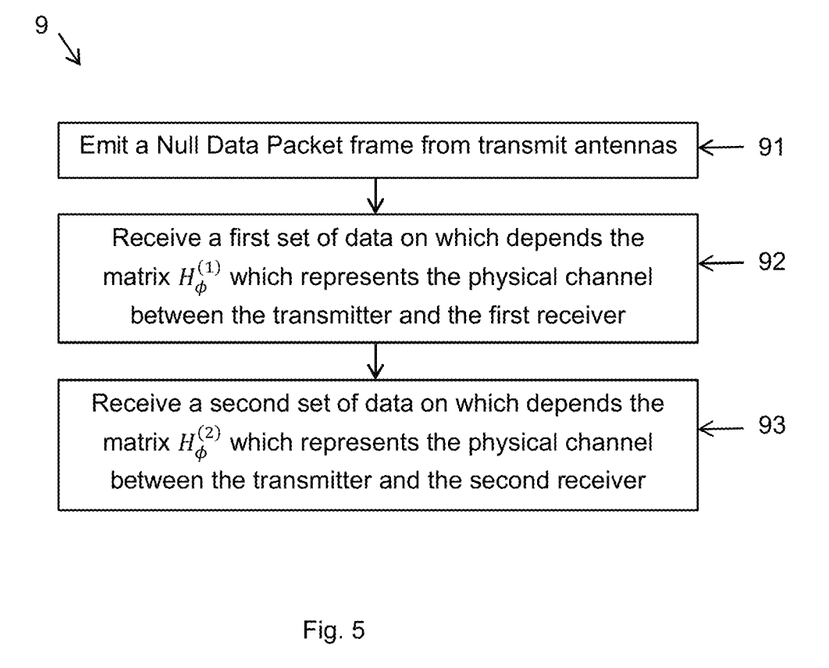
FIG. 5 is a flowchart of a sounding process according to an embodiment of the first aspect of the invention.

During sounding, each user station 230, 240 performs the following actions:

measuring the physical channel $H_\phi^{(d)}$ between itself and the AP 200;

computing a standard singular value decomposition or SVD of $H_\phi^{(d)}$ so that:

$$H_\phi^{(d)} = U^{(d)} \Sigma^{(d)} V^{(d)H};$$

sending feedback matrices $V^{(d)}$ and $\Sigma^{(d)}$ to the beamformer into a feedback frame in the form of a data set.

From the point of view of the AP 200, a sounding step 9 is performed which can comprise the following substeps:

Emitting 91 a Null Data Packet (NDP) frame comprising NTX streams from transmit antennas 201, 202, then From a first user station 230, receiving 92, as a response to the NDP frame, a first set of data on which depends the matrix $H_\phi^{(1)}$ of size NTX×NRX$^{(1)}$ which characterizes physical channel between the AP 200 and the first user station 230, From a second user station 240, receiving 93, as a response to the NDP frame, a second set of data on which depends the matrix $H_\phi^{(2)}$ of size NTX×NRX$^{(2)}$ which characterizes physical channel between the AP 200 and the second receiver 240, wherein each of said first set of data and said second set of data comprises the above mentioned feedback matrices $V^{(d)}$ and $\Sigma^{(d)}$, with d=1 and d=2 respectively.

Generally, each stream among said NTX streams of the Null Data Packet (NDP) frame is more particularly emitted by a single transmit antenna of the transmitter 200, but this is not compulsory.

In a WiFi communication system, said NTX streams of the Null Data Packet (NDP) frame are usually emitted simultaneously, but on several successive symbols in order to obtain a view of all dimensions of each physical channel. Nonetheless, said NTX streams could also be emitted successively, transmit antenna by transmit antenna.

Note that it does not matter if the first and second sets of data sent to the transmitter 200 are emitted by one and/or the other of the receiver antennas 231, 232 and 241, 242.

At this stage, each of matrices $H_\phi^{(1)}$ and $H_\phi^{(2)}$ might be evaluated in function of the corresponding matrices $V^{(d)}$ and $\Sigma_{(d)}$ by applying $H_\phi^{(d)}=U^{(d)}\Sigma^{(d)}V^{(d)H}$, providing $U^{(d)}$ is known for d=1 and d=2. Actually, the AP 200 will use the feedback matrices $V^{(d)}$ and $\Sigma^{(d)}$, rather than matrices $H_\phi^{(d)}$, in order to compute 11 a channel inversion matrix $C^{(d)}$, as described above.

Figure 8:
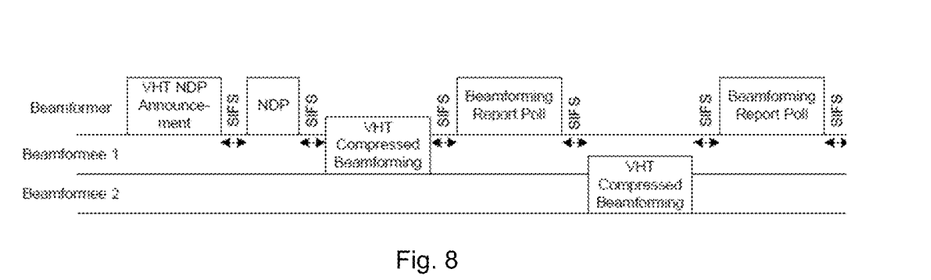
FIG. 8 shows a timing diagram illustrating a detailed embodiment of the sounding process illustrated on FIG. 6.

With references to FIG. 8, the sounding process 9 is described with more details hereafter. Firstly, the beamformer 200 initiates the calibration sequence by transmitting a VHT (Very High Throughput) NDP Announcement frame followed by a VHT NDP after a SIFS (Short InterFrame Space). The number of streams contained in the NDP, $NSTS_{NDP}$, shall be equal to the number of transmit antennas of the AP 200, $NSTS_{NDP}$=NTX. Then, the signal received by the d$^{th}$ user station during the VHT-LTF (Long Training Field) training period of the NDP verifies:

$$R^{(d)}(n)=H_\phi^{(d)}S_{NDP}(n) \text{ with } n=\{1,\ldots,\text{NLTF}\}$$

where $S_{NDP}(n)$ is a NTX dimension vector and where NLTF is the number of LTF. In a WiFi communication system, NLTF≥$NSTS_{NDP}$ (for instance: if $NSTS_{NDP}$=2, then NLTF=2; if $NSTS_{NDP}$=3 or 4, NLTF=4). From the observation of the NLTF VHT-LTF fields, each d$^{th}$ beamformee 230, 240 can estimate the corresponding matrix $H_\phi^{(d)}$. Each matrix IV of size NRX$^{(d)}$×NTX measured by one beamformee 230 or 240 upon the receipt of this NDP is a characterization or a mathematical representation of the physical channel between the beamformer 200 and the considered beamformee 230 or 240.

Then, each beamformee 230 or 240 determines the beamforming feedback matrices $V^{(d)}$ and $\Sigma^{(d)}$ by SVD of $H_\phi^{(d)}=U^{(d)}\Sigma^{(d)}V^{(d)H}$, wherein exponent H refers to the Hermitian operator.

A difference between the sounding step 9 according to the present invention and the standard algorithms consists in that said matrices $V^{(d)}$ and $\Sigma^{(d)}$ are hereby determined as a singular value decomposition of $H_\phi^{(d)}=U^{(d)}\Sigma^{(d)}V^{(d)H}$, wherein $V^{(d)}$ is an orthonormal matrix of size NTX×NRX$^{(d)}$ comprising the NRX$^{(d)}$ left singular vectors of $H_\phi^{(d)}$ and wherein $\Sigma^{(d)}$ is a diagonal matrix of size NRX$^{(d)}$×NRX$^{(d)}$ comprising the NRX$^{(d)}$ strongest singular values of $H_\phi^{(d)}$; each of matrices $V^{(d)}$ and $\Sigma^{(d)}$ are transmitted as such to the AP 200 in order to be subsequently used without approximation. On the contrary, according to the standard algorithms, the AP 200 uses only the first NSS$^{(d)}$ column of each $V^{(d)}$, i.e. the one corresponding to the strongest singular vector, and not said orthonormal matrix $V^{(d)}$ which comprises the NRX$^{(d)}$ left singular vectors of $H_\phi^{(d)}$.

Once the characteristics of the physical channels may be expressed in the form of matrices, such as $H_\phi^{(1)}$ and $D_\phi^{(2)}$, even indirectly through the knowledge of corresponding $(V^{(1)},\Sigma^{(1)})$ and $(V^{(2)},\Sigma^{(2)})$ sets of matrices respectively, there exist several standard algorithms to compute the DL-MU-MIMO steering matrix Q. The simpler is called "Channel Inversion". Another well-known algorithm is called "Block Diagonalization". "Channel Inversion" algorithm simply consists in applying the inverse of each physical channel for pre-coding the broadcasted data symbol. The steering matrix Q computed according to said standard algorithms generally aims at cancelling out the inter-user interference; each user station would receive only the signal intended to it and no part of the signal intended to the other station(s).

Nonetheless, such standard solutions work only if the number of transmit antennas NTX of the AP 200 is larger or equal to the sum of the receive antennas NRX$^{(d)}$ of all the user stations 230 and 240, that is if NTX≥$\Sigma_d$ NRX$^{(d)}$. Indeed, the number of antennas of the AP 200 must be by theory larger than the sum of the number of spatial streams, NTX≥NSStot; a problem of all the standard algorithms is that they assume that the number of receive antennas NRX$^{(d)}$ of each d$^{th}$ user station is equal to the number of spatial streams intended to this d$^{th}$ user station (NRX$^{(d)}$=NSS$^{(d)}$) and consequently they assume that NTX≥$\Sigma_d$ NRX$^{(d)}$.

Now, let consider a scenario as the one illustrated on FIG. 3 where the AP 200 has two transmit antennas 201 and 202 and each of the two considered user stations 230 and 240 has two receive antennas (231, 232 and 241, 242, respectively). The AP 200 may want to transmit a MU-MIMO frame to these two user stations. Nonetheless, because it has only two transmit antennas 201 and 202, the transmitter 200 can transmit only two streams, thus one single stream to each user station. This means that each user station will receive one stream while each user station has two receive antennas. Translated into mathematical formalism, this means that NTX NSStot (as previously), but NTX<$\Sigma_d$ NRX$^{(d)}$.

In this case, the above mentioned standard algorithms can use two different strategies:

1. Antenna Reduction: each user station 230, 240 uses only one of its two receive antennas and feedbacks to the AP 200 data characterizing the physical channel between the AP 200 and the selected receive antenna.
2. Interference Cancellation: each receiver 230, 240 measures the full 2×2 matrix characterizing the physical channel between the AP 200 and its two receive antenna and computes a $V^{(d)}$ matrix of size 2×2. Nonetheless, the AP 200 uses only the first column of each $V^{(d)}$, that is the one corresponding to the strongest singular vector. In this case, the signal received on the receive antennas of the user stations includes a mix of both signals; it is not possible for an AP 200 having only two transmit antennas to cancel out the interference on two sets of two receive antennas. Nevertheless, if each user station includes an equalizer with interference measurement and cancellation, the signal can be properly demodulates.

The here disclosed algorithm does not attempt to have the inter-user interference terms that cancels out at inputs of the user stations, i.e., on their receive antennas (this is impossible in the considered configuration), but it rather consists in cancelling out them at the output of the equalizer of each receiver 230, 240.

Figure 4:
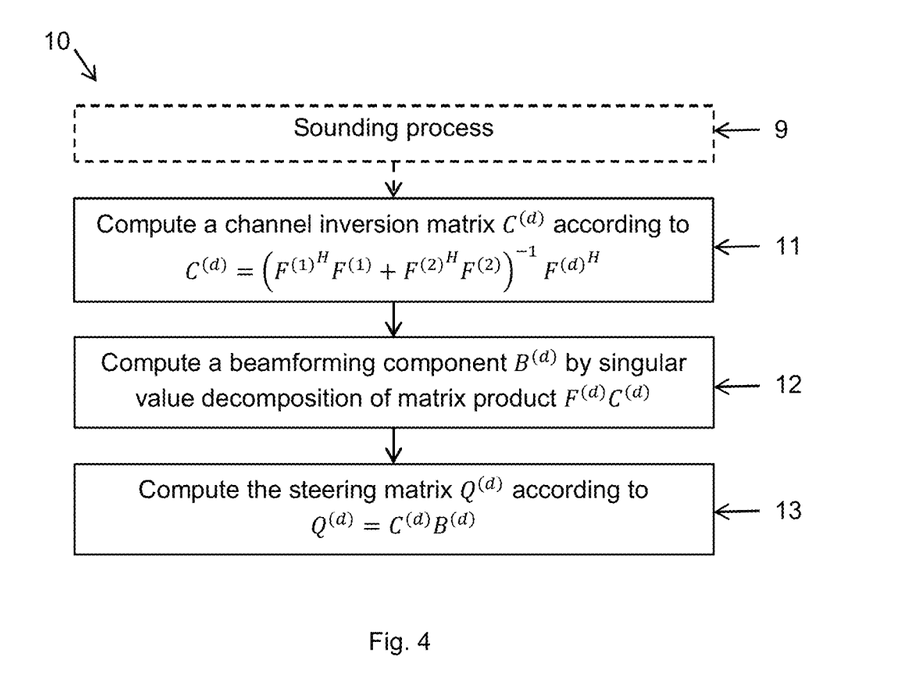
FIG. 4 is a flowchart of the method according to an embodiment of the first aspect of the invention.

FIG. 4 shows the steps of the algorithm performed by the AP 200 to obtain 10 the steering matrix Q according to the invention. It is described hereafter on the basis of the communication system 20 illustrated on FIG. 3, i.e. with an AP 200 equipped with two transmit antennas 201, 202 while the K=2 user stations 230, 240 have each two receive antennas, i.e. in a communication configuration not efficiently supported by the above mentioned standard algorithms. However, it is important to note that the methods 10 and 100 according to the first and second aspects of the present invention are also implementable in communication systems, where the AP 200 has more than two transmit antennas. Moreover, the methods 10 and 100 according to the first and second aspects of the present invention is further implementable in communication systems where at least one among $NRX^{(1)}$ and $NRX^{(2)}$ is strictly inferior to the number of spatial streams intended for said receivers, i.e. $\Sigma_d NSS(d)$.

According to the first aspect of the present invention, the first step of the method 10 for obtaining a steering matrix $Q=[Q^{(1)}, \ldots, Q^{(K)}]$ to be applied for MU-MIMO transmission of data consists in computing 11 a matrix $C^{(d)}$, which can be called channel inversion matrix, of size $NTX \times NRX^{(d)}$ wherein: $C^{(d)}=(F^{(1)H}F^{(1)}+F^{(2)H}F^{(2)})^{-1}F^{(d)H}$.

$F^{(d)}$ is a matrix of size $NTX \times NRX^{(d)}$ whose components depend on those of a matrix $H_\phi^{(d)}$ of size $NTX \times NRX^{(d)}$ which as already established above characterizes physical channel between the AP 200 and the $d^{th}$ user station 230 or 240. More particularly, $F^{(d)}=H_\phi^{(d)}U^{(d)H}$ with $U^{(d)}$ being a unitary matrix, i.e. $U^{(d)H}U^{(d)}=I_{NTX}$, wherein exponent H refers to the Hermitian operator. This computing step 11 of the matrix product $F^{(d)}$ thus depends on the two feedback matrices, $V^{(d)}$ and $\Sigma^{(d)}$, previously received by AP 200 during the sounding step 9 detailed above. As already discussed, these feedback matrices come from the SVD operation performed at each $d^{th}$ user station on each $H_\phi^{(d)}$ matrix measuring the physical channel between the AP 200 and $d^{th}$ user station 230 or 240. Actually, according to the here above detailed sounding process 9, $F^{(d)}=\Sigma^{(d)}V^{(d)H}$, but the present invention is not limited to said sounding process and is implementable with various sounding processes, providing these latter allow evaluating the physical channels between the AP 200 and each $d^{th}$ user station 230 or 240.

Then, in a second step of the method 10, the AP 200 computes 12 a component $B^{(d)}$, which can be called beamforming component, by SVD of matrix product $F^{(d)}C^{(d)}$. More particularly, the beamformer component 300 of the AP 200 computes, for each user station 230 and 240, the matrix product $F^{(d)}C^{(d)}$.

Each beamforming component $B^{(d)}$ is more particularly computed 12 as $NSS^{(d)}$ singular vectors corresponding to the $NSS^{(d)}$ strongest singular values of matrix product $F^{(d)}C^{(d)}$, with the steering matrix component $Q^{(d)}$ being intended to be of size $NTX \times NSS^{(d)}$, where $NSS^{(d)}$ is a number of spatial streams intended for the $d^{th}$ user station.

Then, in a third step, the AP 200 computes 13 the steering matrix component $Q^{(d)}$ according to $Q^{(d)}=C^{(d)}B^{(d)}$. More particularly, the beamformer component 300 of the AP 200 computes, for each user station 230 and 240, the matrix product $C^{(d)}B^{(d)}$ in order to obtain 10 the steering matrix components $Q^{(d)}$ with d={1,2}.

Advantageously, the method 10 according to the first aspect of the invention thus allows of obtaining an optimized steering matrix $Q=[Q^{(1)} \ldots Q^{(2)}]$ that really considers all various communication configurations, such as the one illustrated on FIGS. 2 and 3, where more receive antennas 231, 232, 241 and 242 than spatial streams NSStot are involved.

The steering matrix Q obtained by implementing the method 10 according to the first aspect of the invention is intended to be used for implementing a method 100 for (DL-)MU-MIMO transmission of data according to the second aspect of the invention. As the method 10, the method 100 is implementable by a (DL-)MU-MIMO communication system 20 as illustrated on FIGS. 2 and 3.

Figure 6:
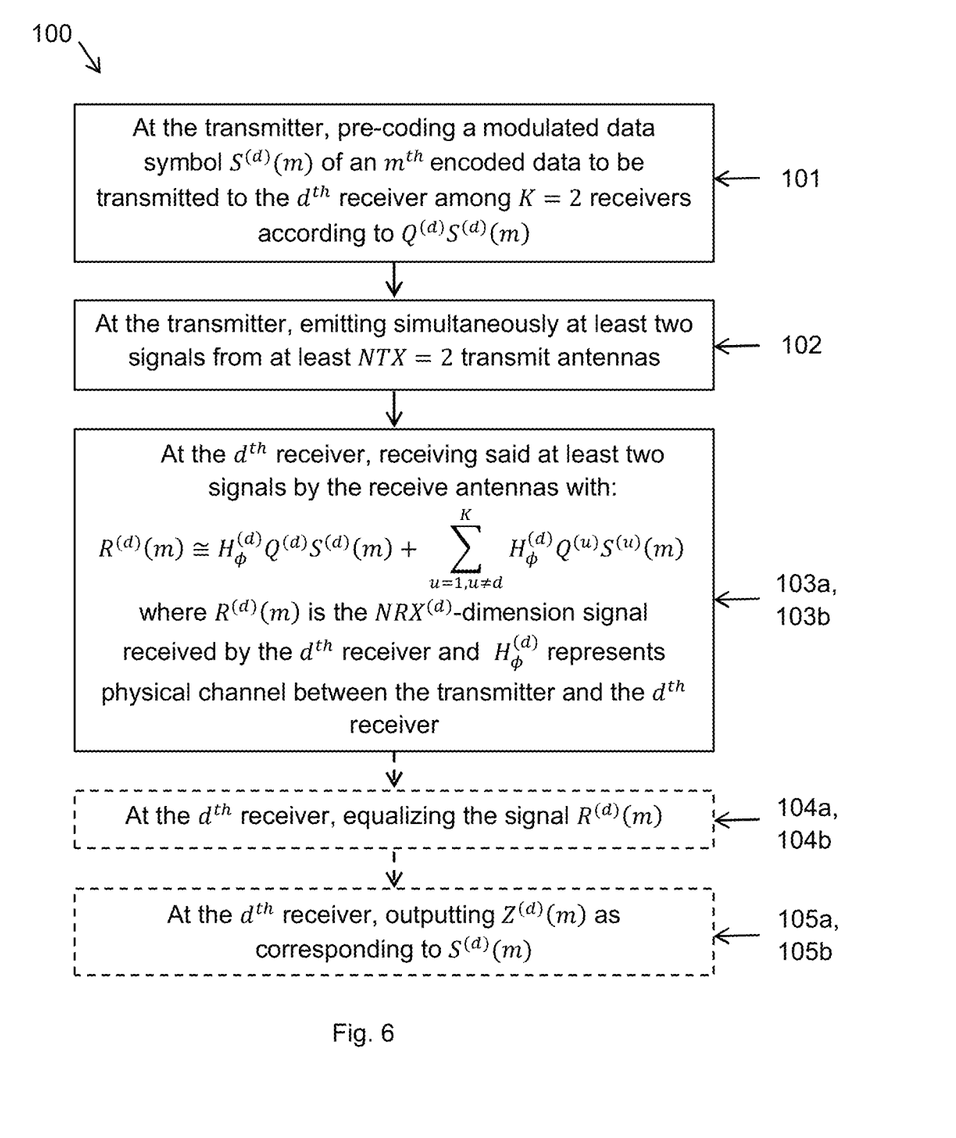
FIG. 6 is a flowchart of the method according to an embodiment of the second aspect of the invention.

With references to FIG. 6, the method 100 according to the second aspect of the invention comprises, with a steering matrix Q obtained according to the method 10 according to the first aspect of the invention as described above, the following steps:

At the level of the transmitter 200, pre-coding 101 a modulated data symbol $S^{(d)}(m)$ of an $m^{th}$ symbol to be transmitted to the $d^{th}$ receiver among said K=2 receivers 230, 240 according to $Q^{(d)}S^{(d)}(m)$, then emitting 102 simultaneously at least two signals, with each of said at least two signals being emitted from said at least NTX=2 transmit antennas 201, 202.

The preceding steps of the method 100 are much particularly such that the method 100 further comprises the following steps:

At the level of the d=1 receiver 230 among the K=2 receivers 230, 240, receiving 103a said at least two signals by the $NRX^{(1)}$ receive antennas 231, 232, with:

$R^{(1)}(m)=H_\phi^{(1)}Q^{(1)}S^{(1)}(m)+H_\phi^{(1)}Q^{(2)}S^{(2)}(m)+WGN^{(1)}(m)$, where each $R^{(1)}(m)$ is an $NRX^{(1)}$-dimension signal received by the d=1 receiver, and where $H_\phi^{(1)}$ is a matrix of size $NTX \times NRX^{(1)}$ characterizing physical channels and $WGN^{(1)}(m)$ are terms which characterize noise levels, between the transmitter 200 and the d=1 receiver 230;

At the level of the d=2 receiver 240 among the K=2 receivers 230, 240, receiving 103b said at least two signals by the $NRX^{(2)}$ receive antennas 241, 242, with:

$R^{(2)}(m)=H_\phi^{(2)}Q^{(1)}S^{(1)}(m)+H_\phi^{(2)}Q^{(2)}S^{(2)}(m)+WGN^{(2)}(m)$, where each $R^{(2)}(m)$ is an $NRX^{(2)}$-dimension signal received by the d=2 receiver, and where $H_\phi^{(2)}$ is a matrix of size $NTX \times NRX^{(2)}$ characterizing physical channels and $WGN^{(2)}(m)$ are terms which characterize noise levels, between the transmitter 200 and the d=2 receiver 240.

Receiving steps 103a and 103b are performed independently from each other.

As already mentioned, the optimized steering matrix Q obtained by implementing the method 10 according to the first aspect of the invention does not tend to cancel out the inter-user interference (characterized by terms $H_\phi^{(1)}Q^{(2)}S^{(2)}(m)$ and $H_\phi^{(2)}Q^{(1)}S^{(1)}(m)$) at the input of each receive antenna 231, 232, 241 and 242. The signals $R^{(1)}(m)$ and $R^{(2)}(m)$ received on the receive antennas of the user stations 230, 240 include a mix of both modulated data symbols $S^{(1)}(m)$ and $S^{(2)}(m)$.

In order to cope with said inter-user interference, each user station 230, 240 may imbed an equalizer 235, 245 capable of measuring signal interferences so that they become able to carry out themselves cancellation of said inter-user interference. For instance, a maximal-ratio combining (MRC) equalizer imbedded into each user station may be used.

The method 100 may then comprise the following steps performed independently at the level of each $d^{th}$ receiver among the K=2 receivers 230, 240, with d={1,2}:

Equalizing 104a, 104b the $NRX^{(d)}$-dimension signal $R^{(d)}$(m) by using coefficients $W^{(d)}$ according to $Z^{(d)}(m) \equiv W^{(d)} R^{(d)}(m)$, said coefficients being pre-computed at the level of each $d^{th}$ user station from an estimation of the effective channel matrix $H_\phi^{(d)} Q^{(d)}$, and Outputting 105a, 105b a signal $Z^{(d)}(m)$ as estimation of the modulated data symbol $S^{(d)}(m)$.

More particularly, let call $W^{(d)}$ the equalizer coefficients used by the $d^{th}$ receiver upon the reception of the (DL-)MU-MIMO transmission described above.

The equalizer output $Z^{(d)}(m) = W^{(d)} R^{(d)}(m)$ of each $d^{th}$ user station verifies:

$$Z^{(1)}(m) = W^{(1)} H_\phi^{(1)} Q^{(1)} S^{(1)}(m) + W^{(1)} H_\phi^{(1)} Q^{(2)} S^{(2)}(m) + W^{(1)} WGN^{(1)}(m)$$

$$Z^{(2)}(m) = W^{(2)} H_\phi^{(2)} Q^{(1)} S^{(1)}(m) + W^{(2)} H_\phi^{(2)} Q^{(2)} S^{(2)}(m) + W^{(2)} WGN^{(2)}(m)$$

There exists different formulas, such as minimum mean square error (MMSE) formula and zero forcing (ZF) formula, to compute the coefficients $W^{(d)}$ of each linear equalization from an estimation of the effective channel $H_\phi^{(d)} Q^{(d)}$. For most classical formulas, and at least for the above mentioned classical formulas, it can be observed that:

$$W^{(1)} H_\phi^{(1)} Q^{(2)} S^{(2)}(m) \equiv 0, \text{ and}$$

$$W^{(2)} H_\phi^{(2)} Q^{(1)} S^{(1)}(m) \equiv 0.$$

The method 100 according to the second aspect of the present invention thus tends to cancel out the inter-user interference at the output of the equalizer 235, 245 of each receiver 230, 240.

Thus the invention discloses a way of computing an improved steering matrix Q which retains the advantage of the standard solution, and more particularly the use of an equalizer within the receivers. This is achieved without limiting the total number of used receive antennas to the number of transmit antennas. The invention allows of implementing simple equalizers, typically maximum-ratio combining (MRC) or Zero Forcing (ZF) equalizers, which are already imbedded in most common user stations, even if more sophisticated equalizers (that carry out interference cancellation) allow of improving the performance of the method 100, as shown hereafter.

Figure 7:
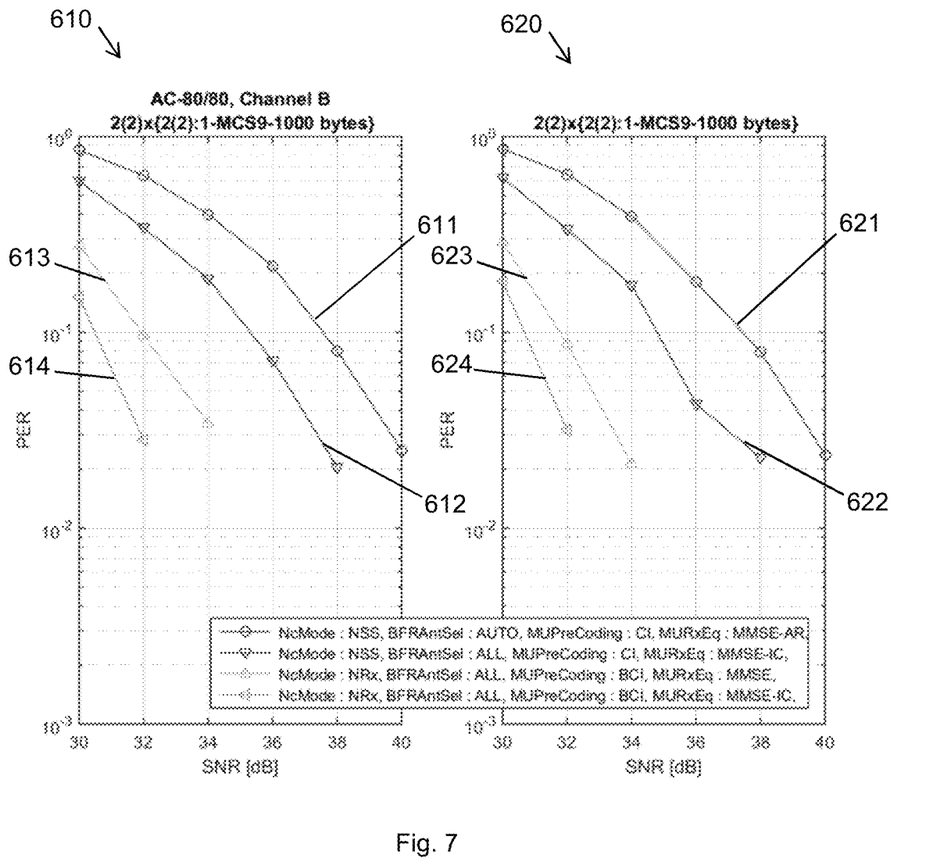
FIG. 7 shows some graphs presenting the performance achievable by the present invention compared to some reference solutions.

FIG. 7 is a comparison of performance simulations obtained by implementing the methods 10 and 100 according to the first and second aspects of the invention versus standard implementations of a DL-MU-MIMO communication system.

Graphs 610, 620 show the obtained packet error rate (PER) of transmitted data symbol (extending on 1000 bytes) versus the signal-to-noise ratio (SNR) (in decibel, dB) of the communication channel. Those results are here obtained through simulations and more particularly through Monte Carlo simulations. Graph 610 shows the simulation results obtained for the first user station 230 and Graph 610 shows the simulation results obtained for the second user station 240. Graphs 610 and 620 should become exactly the same than each other, when the number of iterations of said Monte Carlo simulations tends to infinity. Four cases that have been discussed in the above description are considered:

Curves 611, 621 show simulation results in the case where the user stations 230, 240 carry out an "Antenna Reduction" scheme according to which reception is performed by only one antenna per user station and where the AP 200 computes the DL-MU-MIMO steering matrix Q according to the standard "Channel Inversion" algorithm;

Curves 612, 622 show simulation results in the case where the user stations 230, 240 measure the full 2×2 physical channels during the calibration phase. All of the four user station antennas are used for reception of the MU-MIMO frame. Moreover, in all user stations, a sophisticated equalizer that carries out interference cancellation is implemented. In this case also, the AP 200 computes the MU-MIMO steering matrix Q with the standard "Channel Inversion" algorithm.

Curves 613, 623 show simulation results in the case where the user stations 230, 240 also measure the full 2×2 physical channels and use all of the four user station antennas for the reception of the MU-MIMO frames as above. However, user stations only implement in this case a basic equalizer, e.g. an MRC equalizer, that does not perform any interference cancellation. The AP 200 computes the MU-MIMO steering matrix Q with the method 10 according to the first aspect of the invention. Thus, these curves are representative of what can be obtained when pre-coding is performed with the $Q^{(d)}$ matrices computed as described with reference to FIG. 4.

Curves 614, 624 are the same as above and thus correspond to the use of the invention, except that user stations 230, 240 implement equalizers capable of interference cancellation. A further improvement in performance is observed with respect to the simulation results shown by curves 613 and 623.

Hence, curves 612 and 614 (and curves 622 and 624) can be directly compared to see the benefit of using the methods 10 and 100 according to the present invention since in both cases the user stations 230, 240 use a same equalizer capable of interference cancellation which is not however mandatory for implementing the invention (see curves 613 and 623). A gain improvement of more than 5 dB can thus be observed compared to the standard "Channel Inversion" method of computing the steering matrix Q.

As mentioned above, the method 100 for MU-MIMO transmission of data as described above is particularly relevant when at least one among $NRX^{(1)}$ and $NRX^{(2)}$ is strictly inferior to the number of spatial streams intended for said receivers, i.e. $\Sigma_d NSS^{(d)}$. For example, the method 100 is particularly relevant when:

NTX=3, $NSS^{(1)}$=1, $NRX^{(1)}$=2, $NSS^{(2)}$=2, $NRX^{(2)}$=3; or
NTX=4, $NSS^{(1)}$=2, $NRX^{(1)}$=3, $NSS^{(2)}$=2, $NRX^{(2)}$=4.

Thus the method 10 according to the first aspect of the invention proposes a way to compute a steering matrix Q to be applied for (DL-)MU-MIMO transmission that supports extended configurations of a (DL-)MU-MIMO communication system 20, at least since it allows to use more receive antennas 231, 232, 241 and 242 than available transmit antennas 201 and 202. Indeed, this method 10 allows of avoiding the need to use either an "Antenna Reduction" strategy or an "Interference Cancellation" strategy, as mentioned above.

The method 10 according to the first aspect of the invention further proposes a way to compute a steering matrix Q which allows of improving significantly the quality of subsequent (DL-)MU-MIMO transmissions when the number of receive antennas 231, 232, 241 and 242 of the receivers 230 and 240 is larger than the number of transmit antennas 201 and 202 of the transmitter 200, e.g. when $\Sigma_d$ NRX$^{(d)} \geq$NTX, since it allows to use more receive antennas (belonging to two receivers 230 and 240) than the number of transmit antennas that the transmitter 200 has.

Since more hardware resources are efficiently put to contribution owing to the present methods 10 and 100 according to the first and second aspects of the present invention, it comes that said methods offer much better performance than existing algorithms when $\Sigma_d$ NRX$^{(d)} \geq$NTX.

Moreover, the communication system 20 can switch from or towards a processing mode implementing the methods 10 and 100 according to the present invention, when the conditions of implementation of these methods (in particular when $\Sigma_d$ NRX$^{(d)} \geq$NTX) are fulfilled, other already known methods for obtaining and using other steering matrices Q being usable when these conditions are not fulfilled.

The particular implementations shown and described herein are illustrative examples of the invention and are not intended to otherwise limit the scope of the invention in any way.

What is claimed is:

1. A method for obtaining a steering matrix $Q=[Q^{(1)}, \ldots, Q^{(K)}]$ to be applied for MU-MIMO transmission of data, the method being implemented by a MU-MIMO communication system which comprises at least one transmitter comprising at least NTX=2 transmit antennas and K=2 receivers, with each $d^{th}$ receiver comprising NRX$^{(d)}$ receive antennas, wherein $\Sigma_d$ NRX$^{(d)} \geq$NTX, the method comprising, at the level of the transmitter, the following sequence of steps for each value of d={1,2}:
computing a channel inversion matrix $C^{(d)}$ of size NTX×NRX$^{(d)}$ wherein:

$$C^{(d)} = (F^{(1)H}F^{(1)} + F^{(2)H}F^{(2)})^{-1}F^{(d)H},$$

wherein $F^{(d)}$ is a matrix of size NTX×NRX$^{(d)}$ whose components depend on those of a matrix $H_\phi^{(d)}$ of size NTX×NRX$^{(d)}$ which characterizes physical channel between the transmitter and the $d^{th}$ receiver and wherein exponent H refers to the Hermitian operator;
computing a beamforming component $B^{(d)}$ by singular value decomposition of matrix product $F^{(d)}C^{(d)}$; and
computing the steering matrix Q according to $Q^{(d)}=C^{(d)}B^{(d)}$.

2. The method according to claim 1, wherein the beamforming component $B^{(d)}$ is more particularly computed as NSS$^{(d)}$ singular vectors corresponding to the NSS$^{(d)}$ strongest singular values of matrix product $F^{(d)}C^{(d)}$, with the steering matrix component $Q^{(d)}$ being of size NTX×NSS$^{(d)}$, where NSS$^{(d)}$ is a number of spatial streams intended for the $d^{th}$ receiver.

3. The method according to claim 1, wherein at least one among the number of antenna(s) NRX$^{(1)}$ of the first receiver and the number of antenna(s) NRX$^{(2)}$ of the second receiver is strictly inferior to the number of spatial streams intended for said receivers, i.e. $\Sigma_d$ NSS$^{(d)}$.

4. The method according to claim 1, wherein the MU-MIMO communication system is a WiFi communication system, the at least one transmitter is an access point (AP) of said WiFi communication system, the K=2 receivers are user stations of said WiFi communication system, with the method being a method for obtaining a steering matrix Q to be applied for DL-MU-MIMO transmission of data.

5. The method according to claim 1, further comprising, before said sequence of steps, a sounding step comprising at the level of the transmitter the following substeps:
emitting a Null Data Packet (NDP) frame comprising NTX streams from transmit antennas, then
from a first receiver among the K=2 receivers, receiving a first set of data on which depends the matrix $H_\phi^{(1)}$ of size NTX×NRX$^{(1)}$ which characterizes physical channel between the transmitter and the first receiver,
from a second receiver among the K=2 receivers, receiving a second set of data on which depends the matrix $H_\phi^{(2)}$ of size NTX×NRX$^{(2)}$ which characterizes physical channel between the transmitter and the second receiver.

6. A non-transitory computer readable medium encoded with a computer program comprising instructions which, when implemented by at least one digital processing device, performs at least the steps of the method for obtaining a steering matrix $Q=[Q^{(1)}, \ldots, Q^{(K)}]$ to be applied for MU-MIMO transmission of data according to claim 1.

7. A transmitter comprising at least NTX=2 transmit antennas intended to be used into a MU-MIMO communication system which further comprises K=2 receivers, with each $d^{th}$ receiver comprising NRX$^{(d)}$ receive antennas, wherein $\Sigma_d$NRX$^{(d)} \geq$NTX, wherein said transmitter is configured with a processor to implement the method for obtaining a steering matrix $Q=[Q^{(1)}, \ldots, Q^{(K)}]$ to be applied for MU-MIMO transmission of data according to claim 1.

8. A method for MU-MIMO transmission of data, the method being implemented by a MU-MIMO communication system which comprises at least a transmitter comprising at least NTX=2 transmit antennas and K=2 receivers, with each $d^{th}$ receiver comprising NRX$^{(d)}$ receive antennas, wherein $\Sigma_d$ NRX$^{(d)} \geq$NTX, the method comprising, with a steering matrix $Q=[Q^{(1)}, \ldots, Q^{(K)}]$ being obtained according to the method of any one of claims 1 to 6, the following steps:
at the level of the transmitter, pre-coding a modulated data symbol $S^{(d)}(m)$ of an $m^{th}$ symbol to be transmitted to the $d^{th}$ receiver among said K=2 receivers according to $Q^{(d)}S^{(d)}(m)$, then emitting simultaneously at least two signals from said at least NTX=2 transmit antennas, in order for the method to further comprises the following steps:
at the level of the d=1 receiver among the K=2 receivers, receiving said at least two signals by the NRX$^{(1)}$ receive antennas, with:

$$R^{(1)}(m) = H_\phi^{(1)}Q^{(1)}S^{(1)}(m) + H_\phi^{(1)}Q^{(2)}S^{(2)}(m) + WGN^{(1)}(m),$$

where each $R^{(1)}(m)$ is an NRX$^{(1)}$-dimension signal received by the d=1 receiver, and where $H_\phi^{(1)}$ is a matrix of size NTX×NRX$^{(1)}$ characterizing physical channels and WGN$^{(1)}(m)$ are terms which characterize noise levels, between the transmitter and the d=1 receiver;
at the level of the d=2 receiver among the K=2 receivers, receiving said at least two signals by the NRX$^{(2)}$ receive antennas, with:

$$R^{(2)}(m) = H_\phi^{(2)}Q^{(1)}S^{(1)}(m) + H_\phi^{(2)}Q^{(2)}S^{(2)}(m) + WGN^{(2)}(m),$$

where each $R^{(2)}(m)$ is an NRX$^{(2)}$-dimension signal received by the d=2 receiver, and where $H_\phi^{(2)}$ is a matrix of size NTX×NRX$^{(2)}$ characterizing physical channels and WGN$^{(2)}(m)$ are terms which characterize noise levels, between the transmitter and the d=2 receiver.

9. The method according to claim 5, wherein each of said first set of data and said second set of data comprises matrices $V^{(d)}$ of size NTX×NRX$^{(d)}$ and $\Sigma^{(d)}$ of size NRX$^{(d)}$× NRX$^{(d)}$, with d=1 and d=2 respectively, said matrices $V^{(d)}$ and $\Sigma^{(d)}$ being determined as a singular value decomposition of $H_\phi^{(d)} \equiv U^{(d)}\Sigma^{(d)}V^{(d)H}$, wherein $V^{(d)}$ is an orthonormal matrix comprising the NRX$^{(d)}$ left singular vectors of $H_\phi^{(d)}$ and $\Sigma^{(d)}$ is a diagonal matrix comprising the NRX$^{(d)}$ strongest singular values of $H_\phi^{(d)}$.

10. The method according to claim 8, further comprising, with each d$^{th}$ receiver comprising an equalizer, for instance a maximal-ratio combining (MRC) equalizer, the following steps, with d={1,2}:

equalizing the NRX$^{(d)}$-dimension signal R$^{(d)}$(m) by using coefficients W$^{(d)}$ according to Z$^{(d)}$(m)≡W$^{(d)}$R$^{(d)}$(m), said coefficients being pre-computed from an estimation of the effective channel matrix $H_\phi^{(d)}Q^{(d)}$, and outputting a signal Z$^{(d)}$(m) as an estimation of the modulated data symbol S$^{(d)}$(m).

11. The method according to claim 8, wherein said symbol to be transmitted are encoded by using one among OFDM encoding or COFDM (for Coded Orthogonal Frequency-Division Multiplexing) encoding.

12. A non-transitory computer readable medium encoded with a computer program comprising instructions which, when implemented by at least one digital processing device, performs at least the steps of the method for MU-MIMO transmission of data according to claim 8.

13. A MU-MIMO communication system which comprises at least one transmitter comprising at least NTX=2 transmit antennas and K=2 receivers, with each d$^{th}$ receiver comprising NRX$^{(d)}$ receive antennas, wherein $\Sigma_d$NRX$^{(d)}$≥NTX, wherein said MU-MIMO communication system is configured to implement the method for MU-MIMO transmission of data according to claim 8.

14. A MU-MIMO communication system which comprises at least one transmitter comprising at least NTX=2 transmit antennas and K=2 receivers, with each d$^{th}$ receiver comprising NRX$^{(d)}$ receive antennas, wherein $\Sigma_d$ NRX$^{(d)}$≥NTX, wherein said MU-MIMO communication system is configured to implement the method for MU-MIMO transmission of data according to claim 10.

15. The method according to claim 11, wherein said symbol are modulated by using one among PSK modulation or QAM modulation.

16. A MU-MIMO communication system which comprises at least one transmitter comprising at least NTX=2 transmit antennas and K=2 receivers, with each d$^{th}$ receiver comprising NRX(a) receive antennas, wherein $\Sigma_a$ NRX$^{(d)}$≥NTX, wherein said MU-MIMO communication system is configured to implement the method for MU-MIMO transmission of data according to claim 11.

17. The MU-MIMO communication system according to claim 13, wherein at least one among the number of antenna(s) NRX$^{(1)}$ of the first receiver and the number of antenna(s) NRX$^{(2)}$ of the second receiver is strictly inferior to NSStot=$\Sigma_d$NSS$^{(d)}$, where NSS$^{(d)}$ is a number of spatial streams intended for the d$^{th}$ receiver.

18. The MU-MIMO communication system of claim 16, wherein said symbol are modulated by using one among PSK modulation or QAM modulation.

* * * * *